US006519938B1

(12) United States Patent
Foss

(10) Patent No.: US 6,519,938 B1
(45) Date of Patent: Feb. 18, 2003

(54) RECORDING AND CONTROLLING PNEUMATIC PROFILES

(75) Inventor: R. Scot Foss, Charlotte, NC (US)

(73) Assignee: Coltec Industries Inc., Charlotte, NC (US)

( * ) Notice: Subject to any disclaimer, the term of this patent is extended or adjusted under 35 U.S.C. 154(b) by 0 days.

(21) Appl. No.: 09/224,109

(22) Filed: Dec. 22, 1998

(51) Int. Cl.[7] ........................................ F16D 31/02
(52) U.S. Cl. ........................ 60/410; 60/368; 60/409
(58) Field of Search ..................... 60/368, 409, 410; 173/177; 702/50, 51

(56) References Cited

U.S. PATENT DOCUMENTS 2,244,384 A * 6/1941 Bissinger ..................... 60/410
4,120,033 A * 10/1978 Corso et al. ................. 417/63
4,502,842 A * 3/1985 Currier et al. ............... 702/51
4,576,194 A 3/1986 Lucas et al.
4,597,405 A 7/1986 Oetiker et al.
4,665,938 A 5/1987 Brown et al.
5,190,068 A 3/1993 Philbin
5,319,572 A 6/1994 Wilhelm et al.
5,431,182 A 7/1995 Brown
5,439,063 A * 8/1995 Anders et al. .............. 173/177
5,493,488 A 2/1996 Castle et al.
5,566,709 A 10/1996 Fujii et al.
5,632,146 A 5/1997 Foss et al.
5,689,434 A 11/1997 Tambini et al.
5,713,724 A * 2/1998 Centers et al. ................ 417/53
5,811,669 A * 9/1998 Polonyi ........................ 417/8

* cited by examiner

*Primary Examiner*—F. Daniel Lopez
(74) *Attorney, Agent, or Firm*—William S. Ramsey

(57) ABSTRACT

The pneumatic power system of this invention is a process that measures at very high resolution the pressure and/or rate of flow profile at various points throughout the pneumatic circuitry of a piece of pneumatic equipment in a manufacturing environment. Candidates for this process must use compressed air to move, lift, convey, actuate or otherwise influence the manufacturing process. The signature profile allows for high resolution measurement and recording of pressure and/or rate of flow changes throughout the process when the equipment is fully adjusted and tuned to produce product at maximum efficiency and quality. Once optimum adjustments are obtained, the pneumatic profiling process records the pressure profiles throughout the system and uses the model profile as a benchmark to compare all subsequent profile data.

8 Claims, 5 Drawing Sheets

RECORDING AND CONTROLLING PNEUMATIC PROFILES

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION (1) Field of the Invention

This invention relates to control systems for increasing the power efficiency and quality control of a pneumatic or gas power system used to power a variety of pneumatically operated processes.

(2) Description of Related Art Including Information Disclosed Under 37 CFR 1.97 and 37 CFR 1.98.

Manufacturing facilities often use compressed air or other gas, for example, nitrogen, as means to power tools, pneumatic transport systems, machines, presses and other production equipment, henceforth designated "tools". Compressed air or gas customarily is produced by a compressor or compressors at a central point, stored in a reservoir, and piped to the tools.

The production of compressed air or gas is a major manufacturing expense; it is important to maintain the compressed air or gas system at maximum efficiency in order to minimize energy costs. This invention is used to create a single or multiple-point profile of the gas pressure inputs at a number of points in the compressed air or gas system and within the tools so that the system is operating at maximum efficiency. The profile when compared against the capacitance or storage for the system, process, or tools can be computed against the time register for the computer yielding pressure, rate of flow, rate of change, or both. Such a profile is called a pressure profile, a rate of flow profile, or a rate of change profile. The processes of creation and use of the profile or profiles comparatively is termed SIGNATURE MAPPING, a trademark owned by SDS Management Inc., Mesa, Ariz.

As the plant is operated there is an inevitable movement of the tools from their optimum settings. Contamination of pneumatic circuits with moisture or dirt slowly cause a degradation of the operation. Adjustments in tools change through wear, contamination or unwarranted adjustment by operators. Leaks develop in the pipes, controls and valves. These changes customarily are not recognized until they result in a noticeable decline in productivity or off quality product. At that time the tools are adjusted, the leak is repaired, generally at a substantial cost to productivity. The net effect of such slow and undetected degradation of the pneumatic system is to increase the consumption of power and reduce the productivity of the manufacturing facility.

The present invention continually monitors the pressure readings at the various pressure detectors in the system and compares the readings to the signature map. When an excursion beyond preset limits in the pressure profile is detected at any specific point, the tools are flagged for remedial action, which may be immediate and on-line, or may be stored for analysis by the operator or quality control personnel. SIGNATURE MAPPING is the process of developing the single or multiple point profile and comparing a profile at any specific time with the predetermined profile or map.

Lucas et al. U.S. Pat. No. 4,576,194 discloses a system in which a computer is used to control the supply of air to an output device using the output of the output device to regulate the pressure value leaving the control unit.

Oetiker et al. U.S. Pat. No. 4,597,405 discloses a process for controlling the throughput of pourable or fluid material through a material feed line in a flour mill. The process involves a downstream controller unit and a fluidic pressure drive. The introduction of transient micropressures in the fluidic pressure drive resulted in improved process control.

Brown et al. U.S. Pat. No. 4,665,938 discloses apparatus in which the performance of a current-to-pressure converter which controls the pressure in a system is monitored by a pressure transmitter which feeds-back to a computer information on the pressure actually in the system.

Philbin U.S. Pat. No. 5,190,068 discloses an apparatus in which fluid flow and pressure of fluid passing through a valve is controlled by a computer using information from sensors for pressure and flow upstream and for pressure downstream of the valve and a differential sensor which measures the difference in pressure just above and below the valve.

Wilhelm et al. U.S. Pat. No. 5,319,572 discloses a system for controlling the steam valves in a steam turbine. The system detects malfunctions by sensing temperature, pressure, fluid level, and motor pump current, and either comparing the values to stored previous values or applying diagnostic rules using an artificial intelligence system.

Brown U.S. Pat. No. 5,431,182 discloses a smart valve positioner in which a microprocessor is used to control the valve through a pneumatic actuator in response to sensors of the valve position and temperature.

Castle et al. U.S. Pat. No. 5,493,488 discloses a system for controlling a valve in a pneumatic system.

Fujii et al. U.S. Pat. No. 5,566,709 discloses a system for operating a nuclear power plant in which redundant subsystems such as pumps are normally operated at less than their rated capacity. When one subsystem is out of operation, as for routine maintenance, the other subsystems are increased to their rated capacity, thereby preserving the output of the plant.

Tambini et al. U.S. Pat. No. 5,689,434 discloses a system for monitoring and controlling tools driven by either air or oil. A fluid flow sensor determines fluid flow through the tool, for example, a tool for driving threaded fasteners, and provides information on the torque applied by the tool and the conditions of the tool operation. The information is processed by a computer and displayed in graphic or numerical form.

Foss et al. U.S. Pat. No. 5,632,146, incorporated herein by reference, discloses a system for providing compressed air powered tools and equipment with an adequate supply of compressed air at a satisfactory pressure from a reservoir in which the reservoir is served by two or more compressors which are activated sequentially in response to the air pressure in the reservoir, minimizing the consumption of power by the trim compressor.

None of the prior art disclosures provide a system in which the precise monitoring of pressure and/or rate of flow is used to generate a pressure profile which is subsequently used to detect the slow but correctable degradation of the system or the off quality of the production process, or the precise maintenance requirements of the tools or processes.

BRIEF SUMMARY OF THE INVENTION

This invention, termed SIGNATURE MAPPING, uses one or more pressure transducers which provide an analog output signal calibrated in pressure at pounds per square inch (psig). Such transducers are located at sites of pneumatic or other gas energy discharge, in particular, at or within the tools. Several transducers may be located in one tool, thereby providing extensive information on the operation of the tool. In addition, transducers can be located at various points in the pneumatic power system upstream of the individual tools. The analog signal is converted to a digital signal and transmitted at a speed of 1 MHZ or greater to a computer. The data collected from individual transducers are compared to the signature map. Signature is computed at rates of from one second to 1000th's of a second.

Signature mapping displays the pressure inputs individually or relative to each other in real time. The profile is always relative to time. The resulting map or signature profile may be pressure, rate of flow, rate of change or both. Rate of flow compares the rate of change of pressure in 10th's, 100th's or 1000th's the capacitance of the system or tool monitored and computes it relative to time in milliseconds. Rate of change is only used relative to the system and is used as an expression of the dynamics of the system. If the power or energy in the using side of the system is equivalent to the supply side, which may include storage, the "rate of change" is considered neutral or "0." If demand exceeds supply, the rate of change is expressed as negative. If supply exceeds demand, the rate of change is expressed as positive. Negative and positive rates of change are usually expressed quantitatively in mass flow, energy units, or volume.

Data in which the variance from the signature map exceeds a preset tolerance are flagged. The variance may be reduced by on-line remedial actions on the tool or control processes, or the data may be preserved for manual analysis by operators or quality control personnel. Statistical variations in discreet points or sections of the profile or map can be measured to predict maintenance prior to the tool or process exceeding minimum acceptable quality limits.

In addition, the actual signature maps are preserved and may be plotted and printed to serve as a record of the manufacturing process. Such records are useful in quality control analysis, maintenance scheduling, product liability evidence, process improvement planning, and operator and maintenance personnel training.

SIGNATURE MAPPING may be applied to a wide variety of manufacturing processes, including glass bottle, die cast aluminum parts, rubber tire, plastic or polyethylene terephthalate parts or container manufacturing, compressed air and gas system or equipment auditing and analysis equipment, and air jet weaving and spinning.

Examples of tools whose operation may be maximized by this process include high speed pneumatic production transfer and packaging equipment, bag filling equipment, filter presses, dust collectors, bag houses, or reverse pulse filtration equipment, equipment used in porosity or leak testing, and any repeatable pneumatic or gas process including testing protocols.

In discussing the operation of compressed air systems, it is useful to distinguish between compressed air pressure and compressed air flow, rate of flow versus time. Compressed air pressure is expressed in psig. Compressed air flow is expressed in cubic feet per minute, rate of flow (cfm). The readings determined at the various pressure detectors in the system can measure either pressure, rate of flow, rate of change or both. A compressor will produce a certain volume of compressed air in cfm at a certain pressure in psig. A piece of machinery will consume or demand a certain volume or rate of flow of air in cfm at a certain pressure in psig versus time.

In a compressed air system, the compressors will fill the main storage reservoir at a certain pressure in psig. The demand or flow in cfm is a function of the number and consumption rate of the individual pieces of machinery which consume the compressed air, each piece of machinery consuming a certain flow of compressed air in cfm at a certain psig.

In a factory compressed air system the main storage reservoir contains compressed air at a preset pressure such as 110 psig. This pressure is higher than the optimum operating pressure for the machinery, which may be 85 psig. Regulators are used to reduce the pressure of compressed air provided to the machinery from 110 psig to the optimum operating pressure of 85 psig. This arrangement insures that the machinery always receives compressed air at a pressure adequate for the efficient operation of the machinery. In addition, it avoids the wasteful operation of machinery using compressed air at a pressure higher than the optimum pressure for the machinery.

A typical factory compressed air system has two air compressors of 500 hp capacity, a main storage reservoir of 5,000 gal. capacity which contains compressed air at 110 psig, and piping and regulators which provide machinery with compressed air at a regulated minimum pressure of 85 psig. In a typical system, a single base compressor is in operation all of the time the factory is operating, and the trim compressor is activated when the air pressure in the main storage reservoir drops below a preset pressure termed the add point, 100 psig in this example. The trim compressor is inactivated when the air pressure in the main storage reservoir is restored to a preset value, termed the delete point, 110 psig in this example.

In U.S. Pat. No. 5,632,146, incorporated herein by reference, a system termed "load shaping" which minimized the repeated operation of the trim compressor with a saving in energy consumption was disclosed. The present invention is effective when used with load shaping or when used in conventional systems without load shaping.

An object of the invention is to provide a pneumatic power system in which the pressure input is detected at each tool while the system is operating at maximum efficiency and recorded by a computer thus creating a pneumatic profile. This pneumatic profile may be pressure, rate of flow, rate of change or both.

Another object of the invention is to provide a pneumatic power system in which a profile of pressures or rates of flow at each tool is recorded by a computer and used to detect disfunction of tools in the system by comparing the pressures or rates of flow with a pneumatic profile or profiles versus time.

Another object of the invention is to provide for the adjustment of pressure at each tool in order to maintain the system at optimum efficiency.

Another object of the invention is to provide a permanent record of the pressure or rate of change or flow profile at each tool for use in quality control and training of operators.

Another object of the invention is to reduce the time required to change production equipment for a run of different product on the same processing equipment.

Another object of the invention is to diagnose and test flow components, such as aerospace parts, assemblies such as combusters or even jet engines.

Another object of the invention is to measure the shape, thickness and porosity of containers during manufacturing.

A final object of the invention is to provide a system and method for insuring the maximum efficiency of a pneumatic power system which is inexpensive, effective, and without harmful effects on the environment.

DETAILED DESCRIPTION OF THE INVENTION

Figure 1:
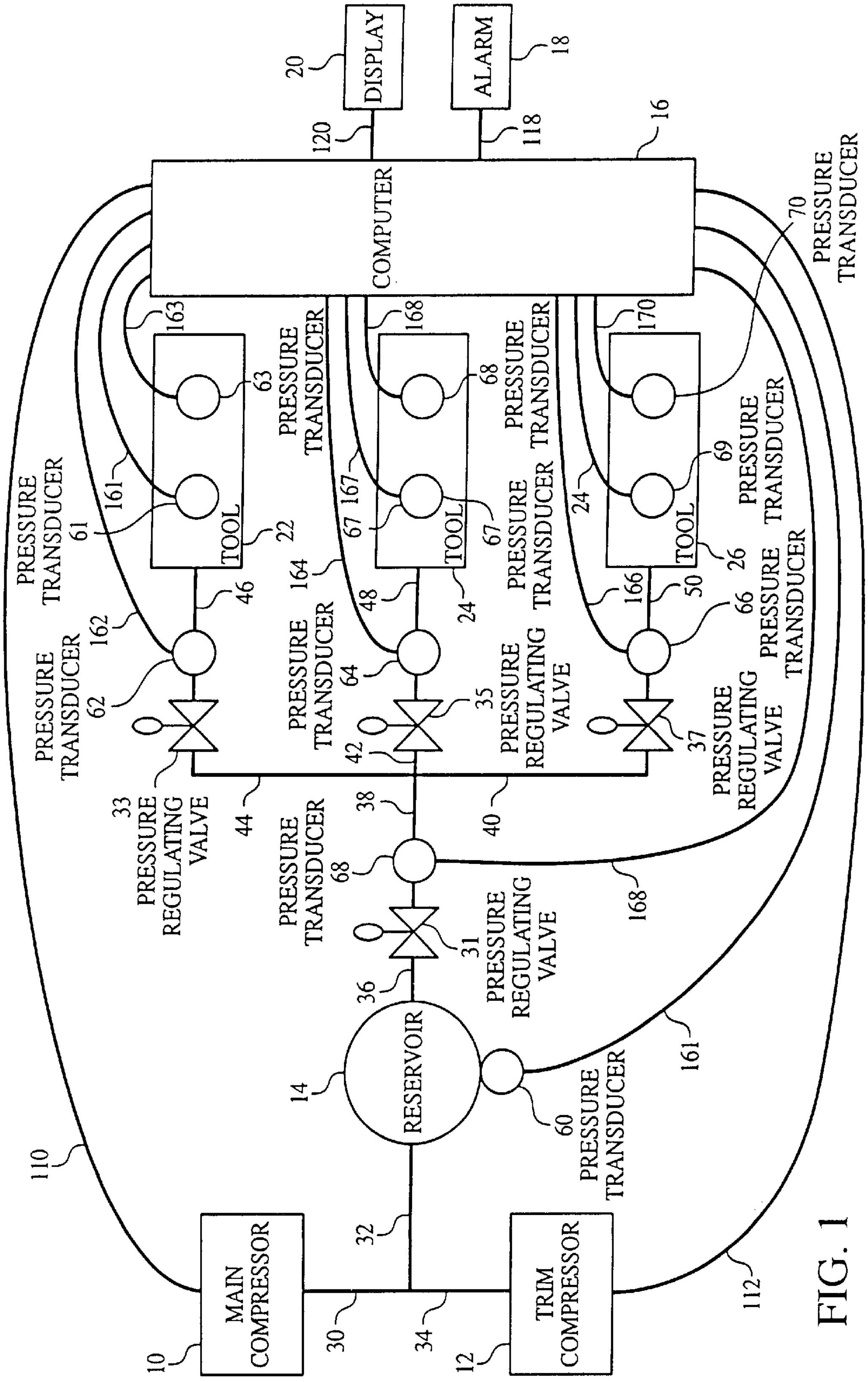
FIG. 1 is a diagrammatical representation of a factory compressed air system used in the SIGNATURE MAPPING process.

FIG. 1 is a diagrammatic representation of a manufacturing plant or system in which a variety of tools are powered by compressed air or gas and are used either in the manufacture of products, such as plastic articles, or in the operation of a process, such as a chemical process which manufactures a pharmaceutical.

In the plant depicted in FIG. 1 the main source of compressed air is the main compressor 10. A secondary source of compressed air is the trim compressor 12. Both compressors typically are of 500 horsepower and provide air at 110 psig. The main compressor 10 is operated continuously while the plant is in operation and the trim compressor 12 is operated intermittently to provide additional compressed air at periods of high demand. Pipes or conduits 30, 32, and 34 connect the main and trim compressors with a reservoir 14. The reservoir may vary in size but typically is of 5,000 gallon capacity. Air from the reservoir 14 enters the conduit 36 and is conveyed through conduits 38, 44, 42, and 40. A pressure regulator valve 31 reduces the pressure of the air from the reservoir to a more suitable level, such as 85 psig. Three tools, 22, 24, and 26 are shown in FIG. 1. Each tool 22,24, and 26 has a pressure regulator valve, 33, 35, and 37, respectively. These pressure regulator valves are adjusted to provide air at a pressure suitable for each tool.

The main compressor 10 and trim compressor 16 are connected to the computer 16 by wire or other electrical connectors 110 and 112, respectively. The operation of the main and trim compressors is controlled by the computer 16 which turns the compressors on or off in response to the pressure in the reservoir 14. A display 20 and alarm 18 are connected to computer 16 by wires 120 and 118, respectively. The display may comprise a cathode ray tube or a printer, or both. The alarm may be a light or audio signal. Any suitable computer with the speed and capacity to store and report information, activate an alarm, and to operate switches and valves, may be used. The computer may be a portable, battery-powered, hand held device or may be installed in the plant and powered by the plant electrical power supply such as a PC. The computer may be connected by a network to other computers and be capable of receiving instructions from and reporting results to a remote source.

Pressure transducers are located at various places in the plant both at points in the compressed air or gas system and in the individual tools where the pressure of the compressed air or gas is controlled. Such transducers measure pressure, rate of flow or rate of change in the compressed air or gas conduits with a sensitivity of 0.01 or 0.001 psig or 10th's, 100th's, or 1,000th's the capacitance of the system respectively. The transducers transmit the pressure, rate of flow or rate of change determinations to the computer 16 at an interval from 25 times per second to 1000 times per second.

Figure 3:
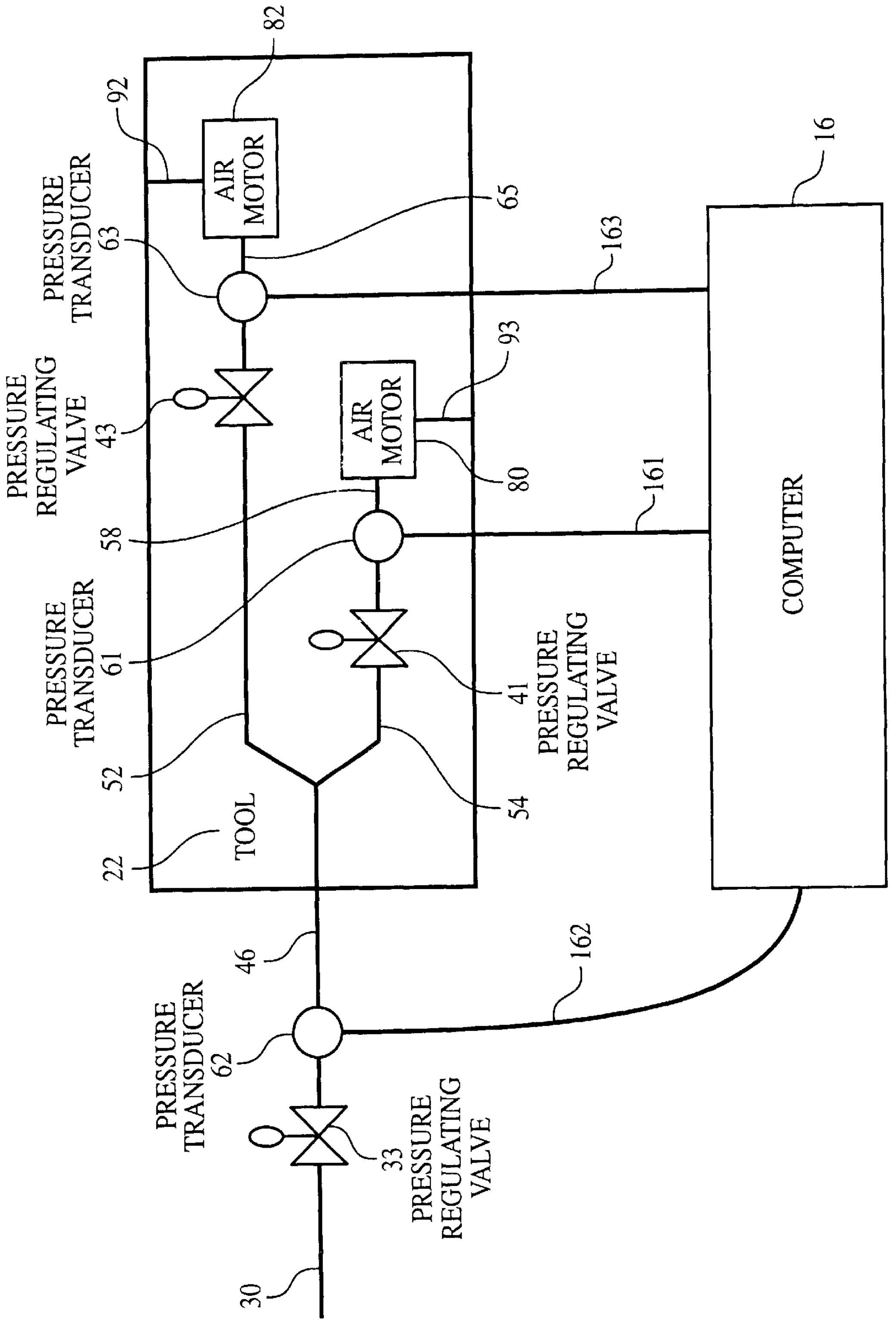
FIG. 3 is a diagrammatical representation of a tool showing the location of pressure transducers.

Pressure transducer 60 measures the pressure, rate of flow or rate of change in the reservoir 14 and is connected to computer 16 by wire or other electrical conductor 161. Pressure transducer 68 measures the pressure, rate of flow or rate of change in the conduit 38 and is connected to computer 16 by wire 168. Pressure transducers 62, 64, and 66 measure the pressure, rate of flow or rate of change in conduits 46, 48, and 50, respectively, and are connected to computer 16 by wires 162, 164, and 166, respectively. Pressure transducers 61 and 63, 67 and 68 and 69 and 70 measure the pressure, rate of flow or rate of change within the tools 22, 24, and 26, respectively, and are connected to computer 16 by wires 161 and 163, 167 and 168, and 169 and 170, respectively. Further details on the tools is shown in FIG. 3.

In operation, the main compressor 10 and trim compressor 12 provide compressed air to the reservoir 14 which provides air to the tools 22, 24, and 26. Operation of the compressors is controlled by the computer 16 in response to the air pressure in the reservoir, as indicated by transducer 60. The pressure of the air is reduced and controlled by pressure reduction valves 31, 33, 35, and 37.

SIGNATURE MAPPING is achieved through plotting against time the pressures and/or rates of flow sensed by transducers 68, 62, 64, and 66 in the conduits and by transducers 61, 63, 67, 68, 69 and 70 which sense pressures or rates of flow in the conduits located in the tools. Further details on the transducers in the tools are found in FIGS.3 and 4. The traces of pressure versus time are called pressure profiles. FIG. 5 is an example of a pressure profile. The traces of rate of flow versus time are called rate of flow profiles. The traces of rate of change versus time are called rate, of change profiles. Once a baseline pressure profile, rate of flow profile, or rate of change profile is established for each transducer per operating cycle, the computer compares additional readings against the baseline pressure, rate of flow or rate of change profile. Deviations from the base line are recorded, and if such variances exceed predetermined values, cause the generation of an alarm signal. The process of generating and using a pressure, rate of flow, or rate of change profile is called SIGNATURE MAPPING.

Information derived using SIGNATURE MAPPING has many practical uses. It is used to determine the process overall air or gas consumption per cycle or per period of time, for example, for determining the consumption of air per minute, per day, week or month or per number of units manufactured.

SIGNATURE MAPPING is used to monitor the pressure differentials between air or gas using components of tools. It predictively warns of the development of pressure differentials which will result in premature wear and failure of specific components before excessive wear occurs.

SIGNATURE MAPPING is used to determine the variability of the process. This variability information is correlated with determination of the quality of the product. This establishes acceptable variances in the signature from process or product run to the next process or product run or from time interval to time interval. The production of unsatisfactory or off quality product or process can be determined from the signature mapping without the costly physical examination of the product or process. By using signature mapping, product or process integrity can be monitored on a sampling or continuous basis. More importantly, variations in the signature mapping can to used to signal the development of conditions which will lead to unsatisfactory quality product or process.

The computer will trigger rejection or marking of product or process, or signal an alert or alarm when signature indicates the development of conditions leading to unsatisfactory product or process. The signal can be monitored on a scan rate or in real time for many pieces of production equipment simultaneously and analyzed on a central computer system to track thousands of pieces of production equipment. The tools then can be adjusted to avoid further degradation of quality in product or process. The adjustments may be done manually or automatically under control of the computer.

SIGNATURE MAPPING can be used to test flow components such as aerospace parts, assemblies such as combusters or even jet engines. A baseline map could be generated and overlaid by current maps to monitor performance and detect irregularities. Discreet elements of the map can determine the precise problem.

SIGNATURE MAPPING can be used to schedule maintenance of the air or gas using equipment or tools. This process will provide very precise indication of the exact maintenance problem or degradation that is occurring. Routine maintenance of equipment and tools using this process becomes directed to maintaining the specific component of a tool which is in need of attention, and avoids the costly and wasteful maintenance of components which are not in need., merely because a predetermined number of operation cycles or length of time has expired since the previous maintenance.

SIGNATURE MAPPING can be used to provide highly accurate cost accounting for power required to manufacture a product or carry out a process in a manufacturing line with many products or a line involving many processes.

SIGNATURE MAPPING can be used to reduce the time required to change production equipment for a run of different product on the same processing equipment. The production equipment would be changed and a SIGNATURE MAP of the process would be measured. The location of adjustments required can be determined by overlaying the actual map on the predetermined model map of the new product on the particular tool or production machine at a particular set of control conditions. The exact adjustments required could then be made more rapidly. Some examples of this would be changing styles on a textile loom, changing tire styles, and setting up a different container for a production run.

SIGNATURE MAPPING reduces the down time and the associated off quality product associated with the installation of a new part in a tool used for product production or for carrying out a process. This process allows the predetermination of the defective part when unsatisfactory results are being obtained.

SIGNATURE MAPPING can monitor the pressure and/or rate of flow of the volume of air during the injection process of container manufacturing. From this information, the shape, thickness, and porosity of the container can be determined during the manufacturing process. A quality report can be generated as the product is being tested. If it is out of statistical tolerance, the product or part can be rejected on line.

Figure 2:
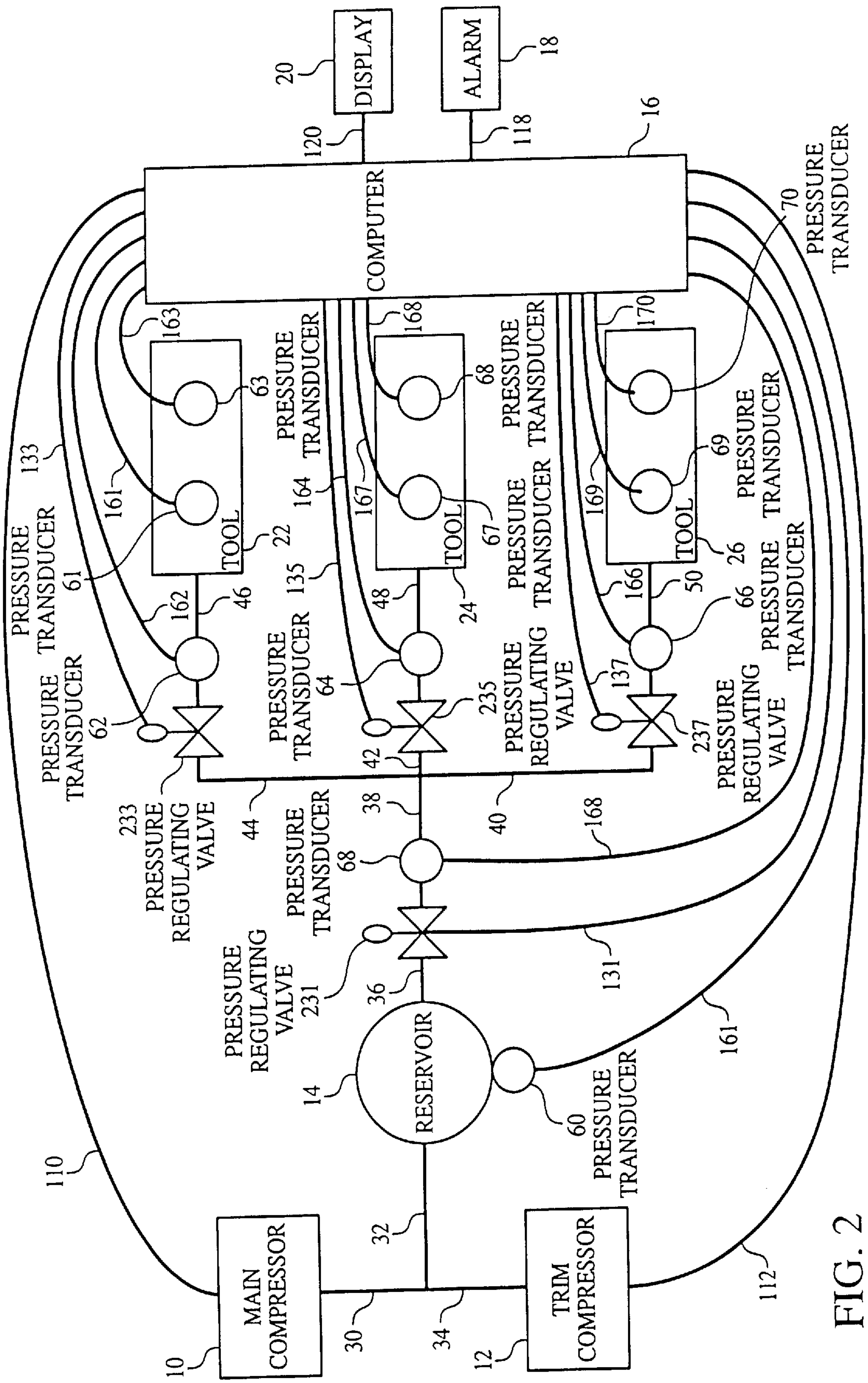
FIG. 2 is a diagrammatical representation of a factory compressed air system with remotely controlled pressure reduction valves used in the SIGNATURE MAPPING process.

FIG. 2 is a second embodiment of the system which has the same elements as FIG. 1 except the tool transducers shown in FIG. 1 are not shown in FIG. 2 in order to simplify FIG. 2 and the pressure regulator valves 31, 33, 35, and 37 in FIG. 1 have been replaced by remotely controlled pressure regulator valves 231, 233, 235, and 237, respectively, in FIG. 2. Remotely controlled pressure regulator valves 231, 233, 235, and 237 are connected to computer 16 by wires 131, 133, 135, and 137, respectively. The remotely controlled pressure regulator valves are controlled by the computer in response to the pressures detected throughout the system by the transducers. The use of remotely controlled pressure regulator valves has the advantages of reducing the labor required to adjust the pressure reduction valves, allowing faster changes in the production layout or schedule, and of generally improving the efficiency of the system through more responsive control of the pressure throughout the system. Any irregularities in the actual versus model map can be automatically reported to the tool controller, central computer or the operator.

FIG. 3 provides additional details to the diagrammatic representation of tool 22 of FIG. 1. Tool 22 is connected to the compressed air or gas supply by conduit 30 with pressure reduction valve 33 and conduit 46. After conduit 46 enters tool 22 it divides into conduits 52 and 54. Conduit 52 has a pressure regulator valve 43 which controls the pressure in conduit 65 which provides compressed air or gas to air motor 82. Air motor 82 represents a compressed air or gas driven device which provides the actual work of tool 22. It may be a rotating motor, for example, which drives a conveyer belt. It may be a pneumatically driven punch or hammer. It may be a valve or pump, for example, which controls the flow of liquid chemicals in a chemical plant. The compressed air or gas from the air motor 82 is exhausted to the atmosphere or otherwise conveyed away from the tool by vent conduit 92. Transducer 63 measures the pressure in conduit 56 and is connected to computer 16 by wire 163. Conduit 54 has a pressure regulator valve 41 which controls the pressure in conduit 58 which provides compressed air or gas to air motor 80. The compressed air or gas from the air motor 80 is exhausted to the atmosphere or otherwise conveyed away from the tool by vent conduit 93. Transducer 61 measures the pressure in conduit 54 and is connected to computer 16 by wire 161.

Figure 4:
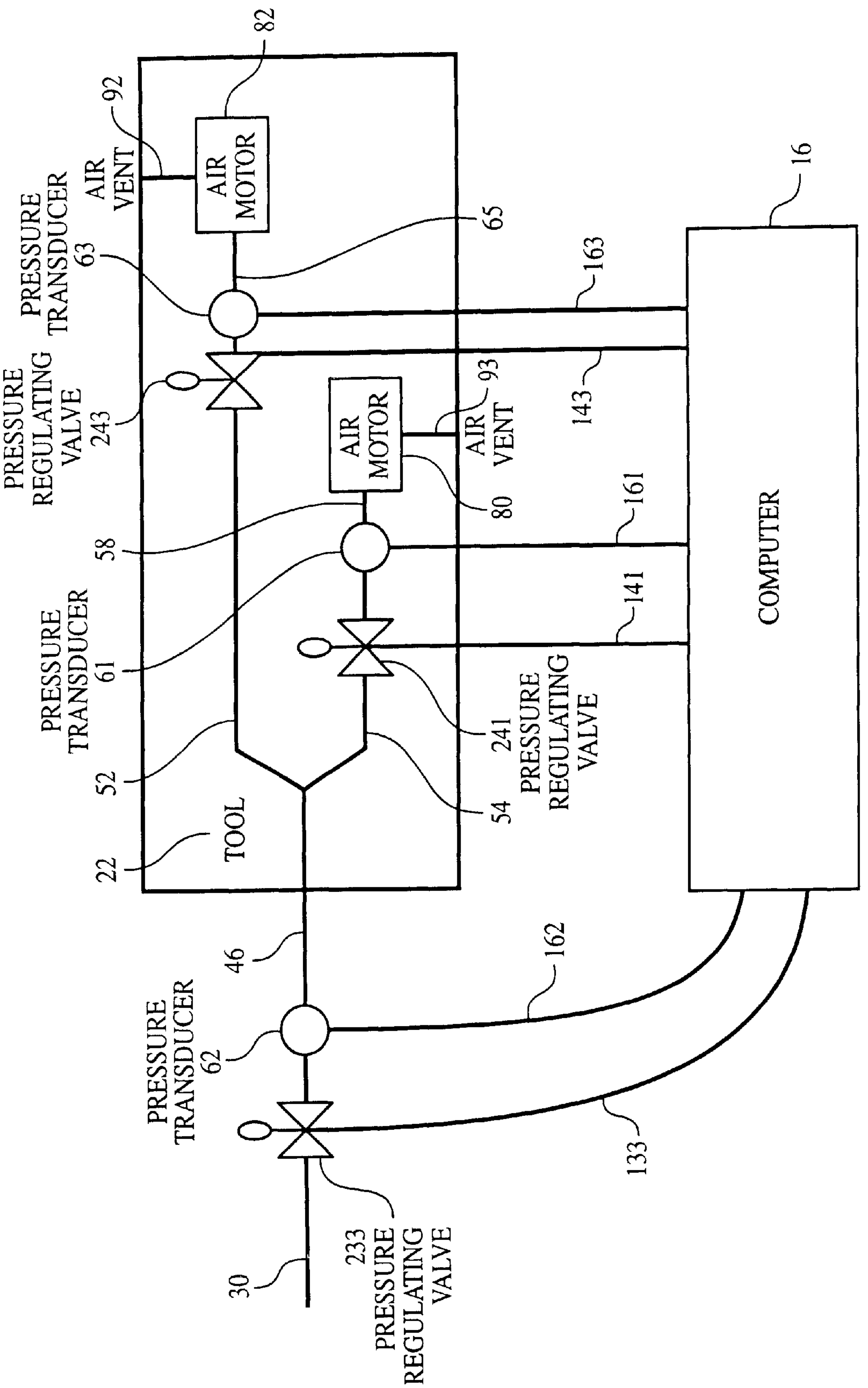
FIG. 4 is a diagrammatical representation of a tool with remotely controlled rate of flow or pressure reduction valves showing the location of pressure transducers.
Figure 5:
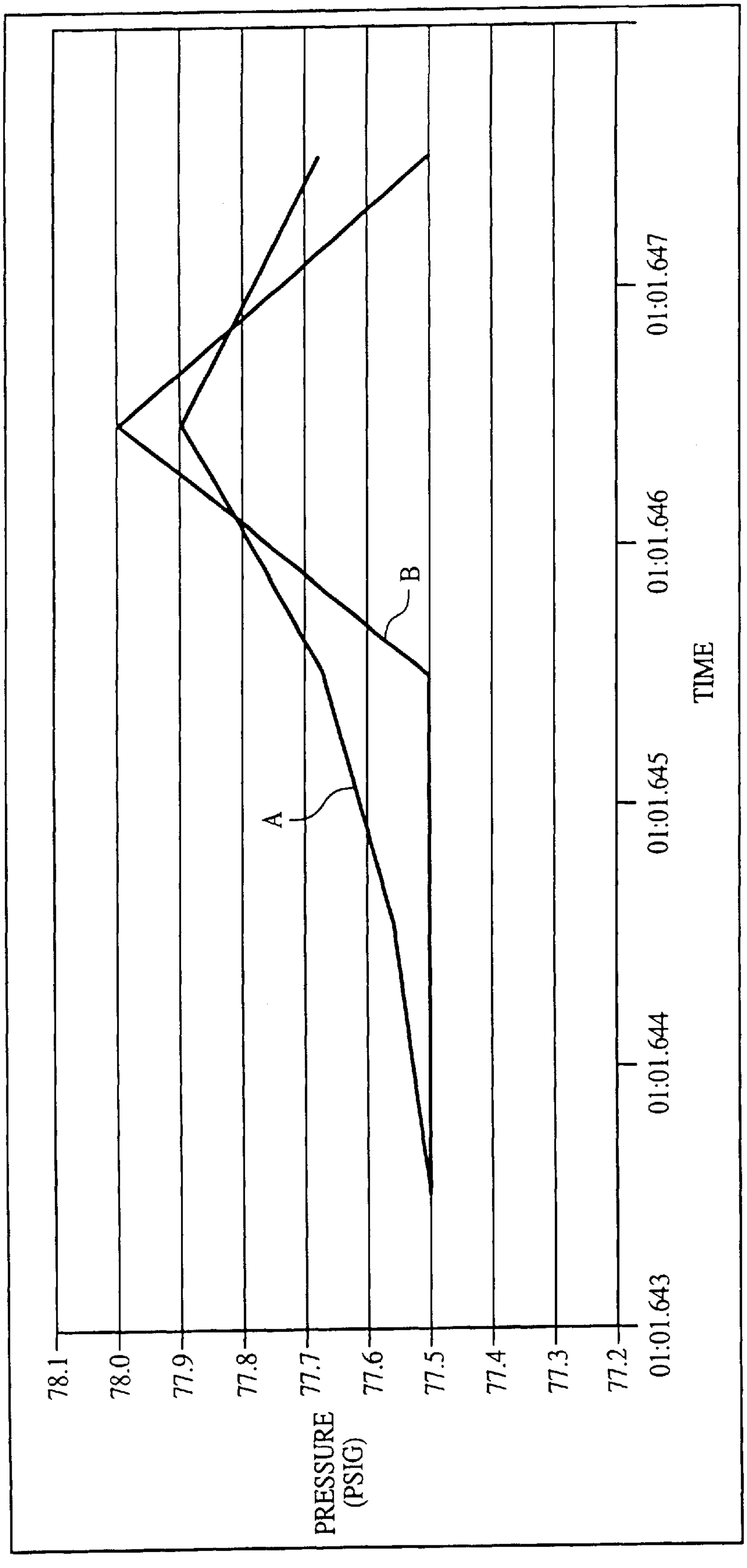
FIG. 5 is a portion of a pneumatic profile.

FIG. 4 is a diagrammatic representation of a second embodiment tool. FIG. 4 is the same as FIG. 3 except the pressure regulator valves 33, 41, and 43 of the embodiment in FIG. 3 are replaced by remotely controlled pressure regulator valves 233, 241, and 243, respectively, in the embodiment in FIG. 4. The second embodiment tool of FIG. 4 may be used with either the first embodiment system depicted in FIG. 1 or the second embodiment system depicted in FIG. 2. The first embodiment tool of FIG. 3 may be used with either the first embodiment system depicted in FIG. 1 or the second embodiment system depicted in FIG. 2.

In FIG. 4 remotely controlled pressure regulator valves 233, 241, and 243 are found on conduits 30, 54, and 52, respectively, and are connected to computer 16 by wires 162, 151, and 163, respectively. The remotely controlled pressure regulator valves are controlled by the computer in response to the pressures and/or rates of flow versus time detected throughout the system by the transducers. The use of remotely controlled pressure regulator valves has the advantages of reducing the labor required to adjust the pressure regulator valves, allowing faster changes in the production layout or schedule, and of generally improving the efficiency of the system through more responsive control of the pressure throughout the tool.

FIG. 5 shows the pressures at a single transducer in a system or tool. Time is indicated at the abscissa in one-thousands of a minute. Pressure is indicated at the ordinate in one tenth of a psig. Line A indicates the predetermined values for this particular transducer when the system or tool is functioning in the most efficient manner at this particular point in the operation cycle. For example, the particular transducer might be at an air motor in a conveyer belt during a complete revolution of the motor rotor. Line B indicates the measured value for this particular transducer when the system or tool is actually functioning at this particular point in the operation cycle. The computer determines the variance between line A and line B. Note that the variance between line A and line B profiles are not greater than 0.2 psig at any time the operation cycle. If, for example, the acceptable variance between line A and line B was 0.3 psig, then no alarm signal would be generated. On the other hand, if the acceptable variance were 0.1 psig, than an alarm signal would be generated indicating excessive variance at specified points in the operation cycle.

The acceptable variance value is determined specifically for each signature map in the system. It will be relatively large at points in the system or tools where the control of pressure is not crucial; and relatively small at points which are crucial to the overall efficiency of the system or tool.

FIG. 5 also can be used to illustrate the role of remotely controlled pressure regulator valves. If the acceptable variance between line A and line B were 0.1 psig, and it was predetermined to alter a remotely controlled pressure regulator valve when the variance exceeded this value, then the remotely controlled pressure regulator valve would be reset in response to the determined variance.

It will be apparent to those skilled in the art that the examples and embodiments described herein are by way of illustration and not of limitation, and that other examples may be used without departing from the spirit and scope of the present invention, as set forth in the appended claims.

I claim:

1. A compressed air or gas power system comprising:

a source of compressed air or gas, a multiplicity of tools operated by the compressed air or gas, conduits connecting the tools and the source of compressed air or gas, pressure transducers for measuring the pressure in the conduits and in the tools, the computer recording the pressure as a value in the conduits and in the tools, and calculating and recording a rate of flow value, a rate of change of the pressure value and a rate of change of flow value, the computer also comparing the values with predetermined values and determining variances between the values and predetermined values and connectors connecting the pressure transducers with the computer.

2. The system of claim 1 further comprising:

display means for displaying the values and variances.

3. The system of claim 1 further comprising:

alert or alarm means for indicating variances which exceed predetermined values.

4. The system of claim 1 further comprising:

remotely controlled pressure regulator valves in the conduits or in the tools for adjusting the pressure in the conduits or in the tools, connectors connecting the remotely controlled pressure regulator valves with the computer, the computer controlling the remotely controlled pressure regulator valves in order to minimize the variances.

5. The process of operating a compressed air or gas system having air or gas compressor means, a multiplicity of tools powered by compressed air or gas, conduit means leading to the tools, pressure transducer means associated with the conduit means and tool means, remotely controlled pressure regulator valve means, and a computer comprising the steps:

1. measuring pressure within the conduit means and within the tool means with the pressure transducer means,
2. recording pressure measurements within the computer,
3. computing rate of flow values and rate of change values in the conduit means and the tools,
4. recording the computed values within the computer,
5. comparing the computed values with predetermined values, and
6. recording variances between the computed values and the predetermined values.

6. The process of claim 5 further comprising the step following step 6:

displaying the recorded values, predetermined values, or variances between the computed values and the predetermined values.

7. The process of claim 5 further comprising the step following step 6:

signaling the detection of variances which are greater than preset values.

8. The process of claim 5 further comprising the step following step 6:

adjusting the remotely controlled pressure regulator valve means if the variances are greater than preset values.

* * * * *